March 1, 1932. M. PISANI 1,847,978
BENZINE FILTER
Filed June 25, 1929    2 Sheets-Sheet 1
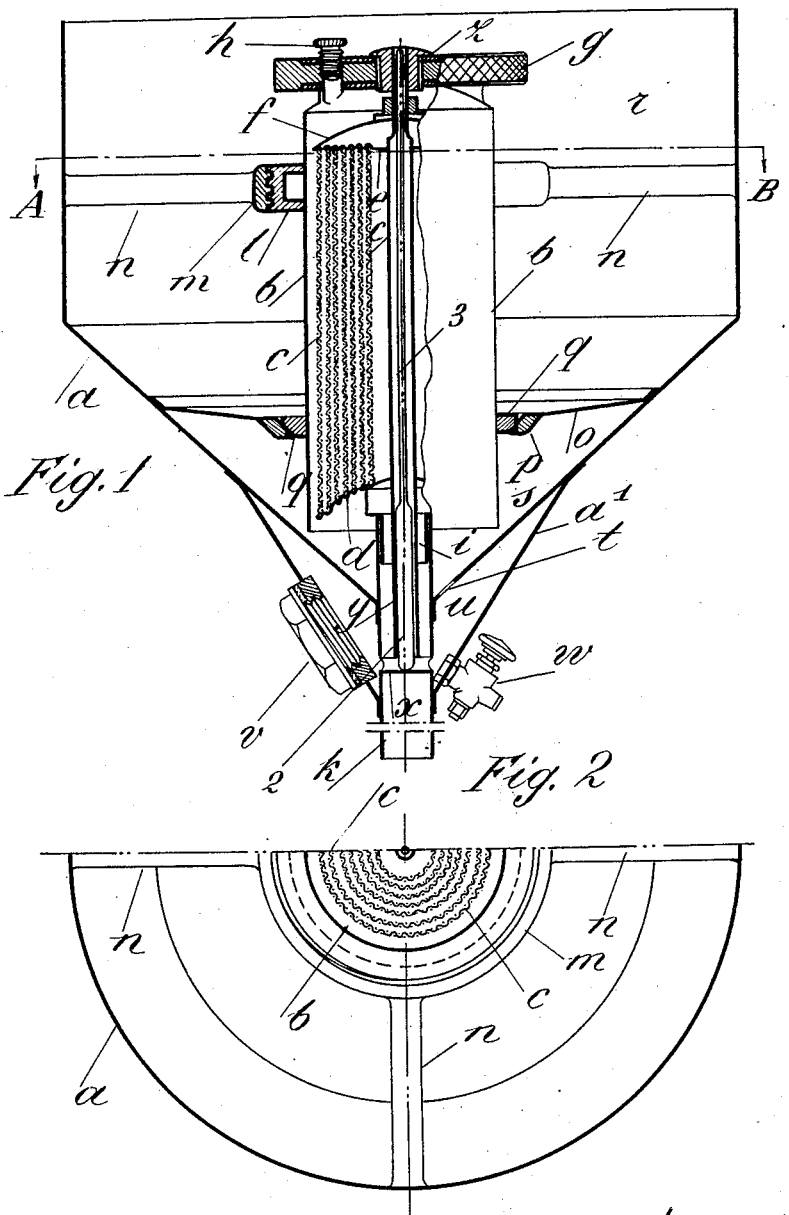
INVENTOR
M. PISANI

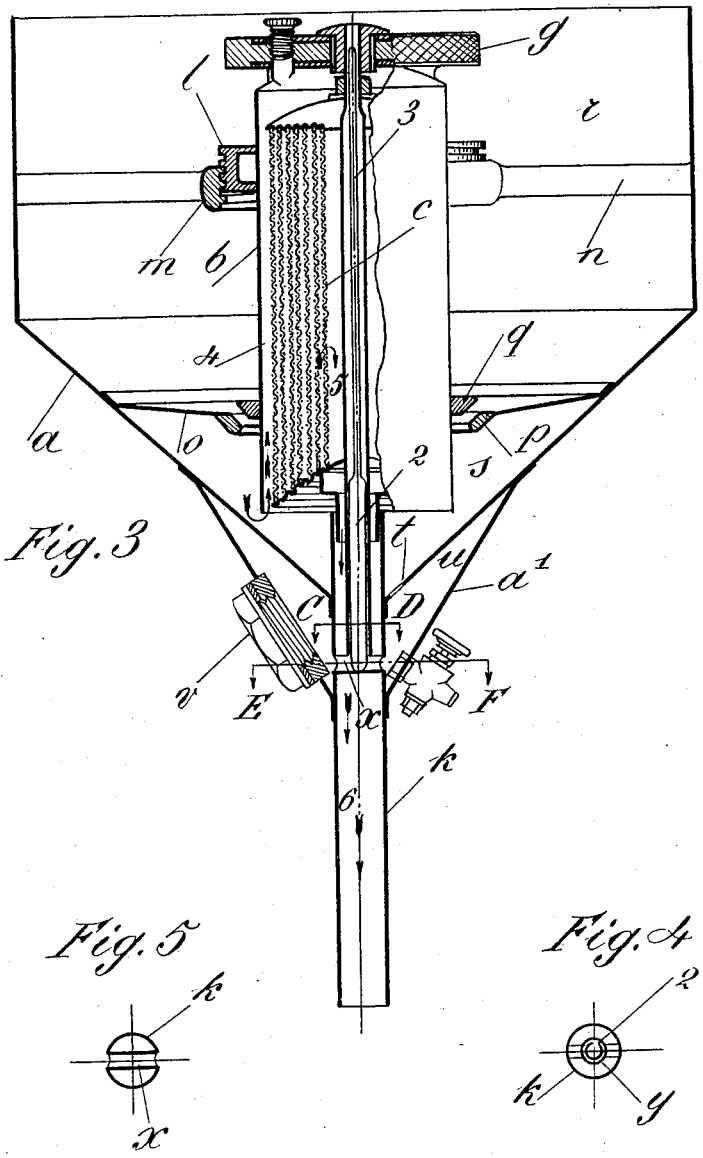

Patented Mar. 1, 1932

1,847,978

UNITED STATES PATENT OFFICE

MARINO PISANI, OF PIOMBINO, ITALY

BENZINE FILTER

Application filed June 25, 1929, Serial No. 373,600, and in Italy February 20, 1929.

It is a well-known fact that benzine requires filtering before use especially in the case of aviation motors. It is also well known that filtration by means of buckskins, chamois and the like is not only very slow, but said skins deteriorate, by becoming riddled with holes, which although very small allow the free passage not only of various impurities, but what is far more serious or harmful, of the water or other foreign liquids which may be held in suspension in the benzine.

The invention forming the subject of the present specification relates to a device which is intended for the filtration of benzine and the like, wherein the use of any leathers is eliminated. This device particularly meets the requirements of rapidity and absolutely obviates any water passing through the filter with the filtered benzine. The device, as stated, filters the liquid with very considerable rapidity as compared with filters using buckskins and the like, with the advantage that no water or any other foreign substance originally contained in the spirit, can possibly pass through the filter.

The filter according to the present invention may be produced of such dimensions as may be most appropriate, and variable according to the number of litres of liquid to be filtered.

Essentially, the invention consists of a casing having a suitable funnel. Upon the vertical axis of the funnel there is a bell having impermeable walls and containing a series of suitable filters, for instance, circular ones of wire gauze.

The filters are suitably supported within the bell, and the latter is capable of being raised through the medium of an appropriately milled knob.

The raising is effected by unscrewing the bell from a support carried by the funnel. The raising of the bell brings about the opening of a valve situated below the funnel.

Another small funnel preferably integral with the first, is located thereunder and serves to collect the water having been separated from the benzine.

In this second funnel is provided a stopper or plug for cleaning out the impurities as well as a cock for the discharge of the water.

The invention will be more precisely understood by following the accompanying drawings which show a practical example of the invention concerned.

In these drawings—

Fig. 1 shows a vertical section of the device with the valve closed;

Fig. 2 is a horizontal section on line A—B of Fig. 1;

Fig. 3 also shows a vertical section of the device, but with the valve open;

Fig. 4 is a horizontal section on line C—D;

Fig. 5 is likewise a horizontal section on line E—F.

According to the example shown in the drawings, the device consists of a funnel $a$ in the shape of a truncated cone for about two-thirds thereof and, for about one-third, cylindrical; in the interior of said funnel, and concentric therewith, is mounted a bell $b$ within which are vertically arranged a series of filters $c$—$c$ which are tubular and concentric one with the other. Said filters are supported and closed below by a cap $d$ provided with special grooves for containing said filters and above with a disk $e$ likewise provided with filter-supporting grooves.

This disk $e$ is connected to a cap $f$ which, in its turn, is connected to a knob $g$ which may be integral with the bell $b$. Extending through the knob into the bell is located at least one screw plug $h$ which when opened permits the discharge of the air from the bell.

The lower cap $d$ carrying the filters is rigidly connected to a small pipe $i$ which enters the lower cylindrical part of the funnel $k$. Said small pipe $i$ performs two functions—that of guiding the ensemble of the bell and of the filters, as well as that of allowing said ensemble to become displaced vertically without thereby deviating from the guide-way. The bell $b$ carries at its upper part, preferably integral therewith, a circular rim $l$ provided with a thread on its peripheral surface. Said thread is screwed to another circular rim $m$ carried by four arms $n$ fixed to the cylindrical portion of the funnel $a$. This arrangement allows the ensemble of the bell with the filters to be vertical while it also allows such ensemble to rise or descend by virtue of the screwing up or down of the bell by means of the knob $g$.

The conical portion of the funnel is provided with a diaphragm $o$ having a conical valve seat $p$. Upon said seat rests, when the bell is completely lowered, a valve $q$ secured to the bell $b$; thus when the bell is raised by means of the knob $g$ the valve $q$ is raised establishing communication between the upper part $r$ of the funnel and the lower part $s$.

This lower part $s$ is provided with a small hole $t$ which, in its turn, puts the chamber $s$ into communication with a third chamber $u$ formed by a small cone $a'$ secured, in its turn, to the conical part of the funnel $a$. This chamber $u$ is provided with a stout stopper or plug $v$ for draining off the waste or impurities, as well as with a cock $w$ for the outflow of the water separated from the benzine. The cylindrical part $k$ of the funnel carries within the chamber $u$ a small transverse pipe $x$ open at both ends, which, in its turn, is provided with upwardly extending branch pipe $y$. This small pipe $y$ extends upwardly almost to the top of the bell, and it is restricted at $z$ where it adjoins the small flywheel $g$. Within this pipe $y$ is contained a small float 2 provided above with a rod 3 which likewise extends to the upper restricted portion $z$ of the pipe $y$.

The water separated from the benzine and passing through $x$ on reaching a higher level raises the float 2. The latter, in its turn, raises the small rod 3 which emerges from the top of the knob $g$ and serves to indicate the quantity of water contained in the chamber $u$. Benzine is admitted into the chamber $r$ of the funnel $a$ and the handle $g$ is turned, whereby the valve $q$ is raised; the benzine passes into the chamber $s$ enters the intervening space 4 (see Fig. 3) thence it passes through the various filters and re-emerges through 5 whence it passes into 6 and thence into the vessel it is required to fill. Meanwhile the water contained in the benzine and rejected from the filters, being heavier than the benzine, remains at the bottom of $s$ and, through the small hole $t$, passes into $u$, traverses the small pipe $x$ and raises the float 2, which by means of its rod 3 will indicate the presence and the level of the water contained in the chamber $u$.

The impurities are removed from the plug $v$ whilst the water escapes from the cock $w$.

In use, when the vessel to filled is full, if there is still any benzine left in the funnel, the passage thereof from the funnel to the vessel may be interrupted by the lowering of the bell $b$, the valve $q$ being thus closed.

It should be understood that the drawings constitute but a schematic form of example, given solely by way of practical showing of the invention, said invention being variable as to its forms and arrangements without, however, departing from the scope of the concept of the invention.

Having now particularly described and ascertained the nature of my said invention and in what manner the same is to be performed, I declare that what I claim is:—

1. In a filter for benzine and the like, in combination, a funnel comprising an upper open topped liquid receiving compartment, a lower compartment, an outflow pipe extending up into the lower compartment and a partition between the two compartments, a manually controlled vertically opening valve in the partition, a subsidiary compartment disposed below the lower compartment and in communication therewith for receiving the water and impurities of greater specific gravity than the benzine passed down into the lower compartment through the valve, and means for drawing off the impurities and water from the subsidiary compartment.

2. In a filter for benzine and the like, in combination, a funnel comprising an upper open topped liquid receiving compartment, a lower compartment, an outflow pipe extending up into the lower compartment and a partition between the two compartments, a manually controlled vertically opening valve in the partition, a subsidiary compartment disposed below the lower compartment and in communication therewith for receiving the water and impurities of greater specific gravity than the benzine passed down into the lower compartment through the valve, means for drawing off the impurities and water from the subsidiary compartment, and externally visible means for indicating the level of the water in the subsidiary compartment, said means extending up through the outflow pipe, lower and upper compartments.

3. In a filter for benzine and the like, in combination, a funnel comprising an upper open topped liquid receiving compartment, a lower compartment, an outflow pipe extending up into the lower compartment and a partition between the two compartments, a valve seat in the partition, a bell having its lower open end disposed in the lower compartment, a valve member mounted on the bell and adapted to cooperate with the valve seat at least one filter screen sealed at top and bottom disposed in the bell, the benzine passing from the lower compartment into the bell exteriorly of the filter screen and filtered therethrough in an inward direction, and an outflow pipe communicating with the interior of the screen.

4. In a filter for benzine and the like, in combination, a funnel, a transverse partition dividing the funnel into an upper and lower compartment, a manually controlled valve in the partition, a bell associated with the valve and its lower open end disposed in the lower compartment, at least one filter screen sealed at top and bottom disposed in the bell, the benzine passing from the lower compartment into the bell exteriorly of the filter screen and filtered therethrough in an inward direction, an outflow pipe communicating with the interior of the screen, and manually controlled means for raising and lowering the bell to open and close the valve in the partition.

5. In a filter for benzine and the like, in combination, a funnel, a transverse partition dividing the funnel into an upper and lower compartment, a manually controlled valve in the partition, a bell associated with the valve and its lower open end disposed in the lower compartment, at least one filter screen sealed at top and bottom disposed in the bell, the benzine passing from the lower compartment into the bell exteriorly of the filter screen and filtered therethrough in an inward direction, an outflow pipe communicating with the interior of the screen, and manually controlled means for raising and lowering the bell to open and close the valve in the partition, said manually controlled means including an internally threaded ring supported in the funnel and an externally threaded rim on the bell threaded thereinto.

6. In a filter for benzine and the like, in combination, a funnel, a transverse partition dividing the funnel into an upper and lower compartment, a manually controlled valve in the partition, a bell upon which the valve is mounted disposed with its lower open end in the lower compartment, at least one filter screen sealed at top disposed in the bell, the benzine passing from the lower compartment into the bell exteriorly of the filter screen and filtered therethrough in an inward direction, an outflow pipe communicating with the interior of the screen, and a subsidiary compartment located below the lower compartment and in communication therewith for receiving the water and impurities of greater specific gravity than the benzine prior to the benzine passing through the filter in the bell.

7. In a filter for benzine and the like, in combination, a funnel, a transverse partition dividing the funnel into an upper and lower compartment, a manually controlled valve in the partition, a bell upon which the valve is mounted disposed with its lower open end in the lower compartment, at least one filter screen sealed at top disposed in the bell, the benzine passing from the lower compartment into the bell exteriorly of the filter screen and filtered therethrough in an inward direction, an outflow pipe communicating with the interior of the screen, a subsidiary compartment located below the lower compartment and in communication therewith for receiving the water and impurities of greater specific gravity than the benzine prior to the benzine passing through the filter in the bell, said outflow pipe passing through the subsidiary compartment, a transverse pipe extending through that portion of the outflow pipe disposed in the subsidiary compartment, said transverse pipe open to the subsidiary compartment, an upwardly extending branch pipe communicating with the transverse pipe and extending up through the outflow pipe and bell, and a float in said branch pipe including an indicating rod extending up through the branch pipe and adapted to protrude from its upper end upon the water in the subsidiary compartment rising a predetermined extent.

8. A combined separator and filter comprising a funnel, a water collecting chamber located around the neck of the funnel and having communication with the interior of the funnel, a partition in the funnel dividing the same into an upper and lower chamber, said partition having a valve seat, and a filtering device carrying a valve to close said seat, adjustable in said funnel to move said valve toward and away from said seat.

MARINO PISANI.